US006912567B1

(12) United States Patent
Allard et al.

(10) Patent No.: US 6,912,567 B1
(45) Date of Patent: Jun. 28, 2005

(54) BROADBAND MULTI-SERVICE PROXY SERVER SYSTEM AND METHOD OF OPERATION FOR INTERNET SERVICES OF USER'S CHOICE

(75) Inventors: David J. Allard, Boynton Beach, FL (US); James M. Dunn, Fresno, CA (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/472,602

(22) Filed: Dec. 27, 1999

(51) Int. Cl.$^7$ ............................................... G06F 17/00
(52) U.S. Cl. ...................... 709/223; 709/203; 709/217; 709/219; 709/222; 709/226; 709/227; 709/229; 709/238; 370/352; 370/401; 370/260
(58) Field of Search ................................ 709/217, 226, 709/222, 219, 203, 212, 213, 223, 227, 230, 229, 238; 370/352, 401, 260

(56) References Cited

U.S. PATENT DOCUMENTS

| | | | | |
|---|---|---|---|---|
| 5,949,779 | A | | 9/1999 | Mostafa et al. |
| 6,101,182 | A | * | 8/2000 | Sistanizadeh et al. ........ 370/352 |
| 6,145,002 | A | * | 11/2000 | Srinivasan ................... 709/225 |
| 6,178,455 | B1 | * | 1/2001 | Schutte et al. .............. 709/226 |
| 6,212,563 | B1 | * | 4/2001 | Beser .......................... 709/227 |
| 6,345,051 | B1 | * | 2/2002 | Gupta et al. ................ 370/260 |
| 6,351,773 | B1 | * | 2/2002 | Fijolek et al. ............... 709/222 |
| 6,370,147 | B1 | * | 4/2002 | Beser .......................... 370/401 |
| 6,430,276 | B1 | * | 8/2002 | Bouvier et al. ......... 379/121.01 |
| 6,490,620 | B1 | * | 12/2002 | Ditmer et al. .............. 709/224 |
| 6,577,627 | B1 | * | 6/2003 | Driscoll et al. ............. 370/389 |

OTHER PUBLICATIONS

R. Droms, RFC 2131, Mar. 1977, Bucknell Univeristy, pp. 1–45.*
Ralph Droms, RFC 2131—Dynamic Host Configuration Protocol, Mar. 1997, pp. 1–45.*
S. Alexander and R. Droms, RFC 2132—DHCP Options and BOOTP Vendor Extensions, Mar. 1997, pp. 1–34.*

* cited by examiner

*Primary Examiner*—Joseph Feild
*Assistant Examiner*—Chau Nguyen
(74) *Attorney, Agent, or Firm*—Morgan & Finnegan, LLP; Joseph C. Redmond, Jr.

(57) ABSTRACT

A broadband multi-server proxy server (BMPS) enables customers to select an ISP of their choice from the Internet. The BMPS has a database and is coupled to a router. In operation, the cable customers register with a selected ISP of their choice. The selected ISP sends the customers a customer ID, password, a log on script and updates its database and the database of the BMPS with the customer information. The BMPS sends a customer logon request to the requested ISP using the customer ID, password and the BMPS as the source address for any customer message. The ISP verifies the customer address against its database and updates the router address tables to accept customer messages with the new address. Future customer messages are sent directly to the selected ISP bypassing the standard Internet DHCP protocol.

17 Claims, 7 Drawing Sheets

BROADBAND MULTI-SERVICE PROXY SERVER SYSTEM AND METHOD OF OPERATION FOR INTERNET SERVICES OF USER'S CHOICE

BACKGROUND OF THE INVENTION

1) Field of Invention

This invention relates to a communication systems and methods of operation. More particularly, the invention relates to a broadband multi-service proxy server in a communication system and method of operation for Internet services of user's choice.

2) Background Discussion

In today's Internet environment, individual users may choose any initial Internet Service Provider (ISP) they wish. The ISP provides the user a dial-in number and a log on script that contains the user-id and oftentimes a password. In a typical scenario, when the user dials in, an authentication server answers the call (dial modem), and if the ID is authenticated, assigns the user to an Internet address from a local pool of addresses. From this point on, the user is connected to the Internet through the dedicated dial line and the ISP's router.

In a broadband IP-based network, however, where multiple users share a common connection line, there is currently no way to attach a group of users to their individual choices of an ISP. A user may send a connection request to their ISP, and to their authentication server, but since the network authentication server has not yet assigned the user's IP address to them, there is no way for the return message to be routed back to the user. For this reason, cable company customers must purchase their ISP functions from the cable company affiliated ISP, since the authentication process must know to whom to assign an IP address.

What is needed in the art is a system and method of operation for broadband customers in a communication system to connect to an ISP of their choice for Internet services and not be attached to an ISP affiliated with a broadband network, e.g. a cable network for Internet services.

Prior art related to servicing broad band customers in another network includes:

U.S. Pat. No. 5,949,779 issued Sep. 7, 1999, filed May 8, 1997 discloses a system for providing remote access and control of electronic devices connected to a consumer electronic bus (CEB). A proxy node is provided on a CEB bus wherein the proxy node is also linked to a master node via a broad band access network. The remotely located master node may communicate with one or more devices located on a CEB bus by transmitting messages to the proxy node over the broad band area network. The proxy node converts messages from a ATM protocol compatible with transmissions over the broad band area network to a CEB bus network protocol and then forwards the messages to recipient devices over the CE bus network. In the opposite direction, a device on a CE bus network may communicate with a remotely located master node by transmitting CE bus—standard messages to the respective proxy nodes over the CE bus network. The proxy node packatizes the messages into an ATM transmission format and forwards the messages to the master node over the broad band area network The prior art fails to disclose a broadband communication system which enables users to connect to the Internet using an Internet Service Provider of their choice.

SUMMARY OF THE INVENTION

An object of the invention is a system and method of operation enabling customers of broadband networks to receive Internet service from providers of their choice.

Another object is a broadband multiservice proxy server and method of operation, which allow broadband network customers to obtain Internet service from Internet service providers of their choice.

Another object is a broadband multi-service proxy server and method of operation in an Internet enviroment using a message format which enables broadband customers to select an ISP of their choice for services available from the Internet.

These and other objects, features and advantages are achieved in a broadband multi-server proxy server and method of operation using an extended DHCP message format which enables broadband customers, typically cable network customer, to select an ISP of their choice for services available from the Internet. A broadband network includes a multi channel cable coupled at one end to a plurality of customers and a home network serving several stations within a location. The network is coupled at the other end to head end equipment providing cable services to the cable customers. Each customer is assigned a Medium Access Control (MAC) address on the network. The head end equipment is linked to a modem management system and a router. A broadband Multi-service Proxy Server (BMPS) having a database containing customer service information is coupled to the router. The MAC addresses of the cable customers are stored in the database. An Internet Service Provider (ISP), each ISP being linked to the Internet. In operation, the cable customers register with the ISPs of their choice. The ISPs send the customers a customer ID, password, a log on script and updates its database and the database of the BMPS with the customer information. The BMPS authorizes the customer modem and router for access to the ISP. As part of a customer's logon request, the MAC address is attached to identify the origination point of the request. The logon script sends the logon request in an extended DHCP message to the ISP via the BMPS for an Internet address. The BMPS checks the logon request against the database to verify a legitimate customer and obtains the customer profile for management and billing purposes. The BMPS sends the logon request to the requested ISP using the customer ID, password and the BMPS as the source address for any customer message. The ISP verifies the customer address again its database and updates the router address tables to accept customer messages with the new address. Normal customer ISP traffic begins. Return message to the customer are received by the BMPS which forwards the messages to the customer at their address. When the customer logs off, the ISP expires the customer address, updates the router as necessary and sends a logoff message to the BMPS. The BMPS cancels the customer address, updates the router; the datbase and billing files as necessary. The broadband multi-service proxy server can remain in the serial path if desired to continuously check on the validity of the packets and also count the packets for billing purposes traversing their link. Alternatively, the broadband multi-service server can be removed from the link allowing the packets to flow directly to the router and thence to the Internet through the ISP of their choice.

DESCRIPTION OF THE DRAWINGS

The invention will be further understood from the following detailed description of a preferred embodiment taken in conjunction with an appended drawing, in which.

DESCRIPTION OF PREFERRED EMBODIMENTS

Figure 1:
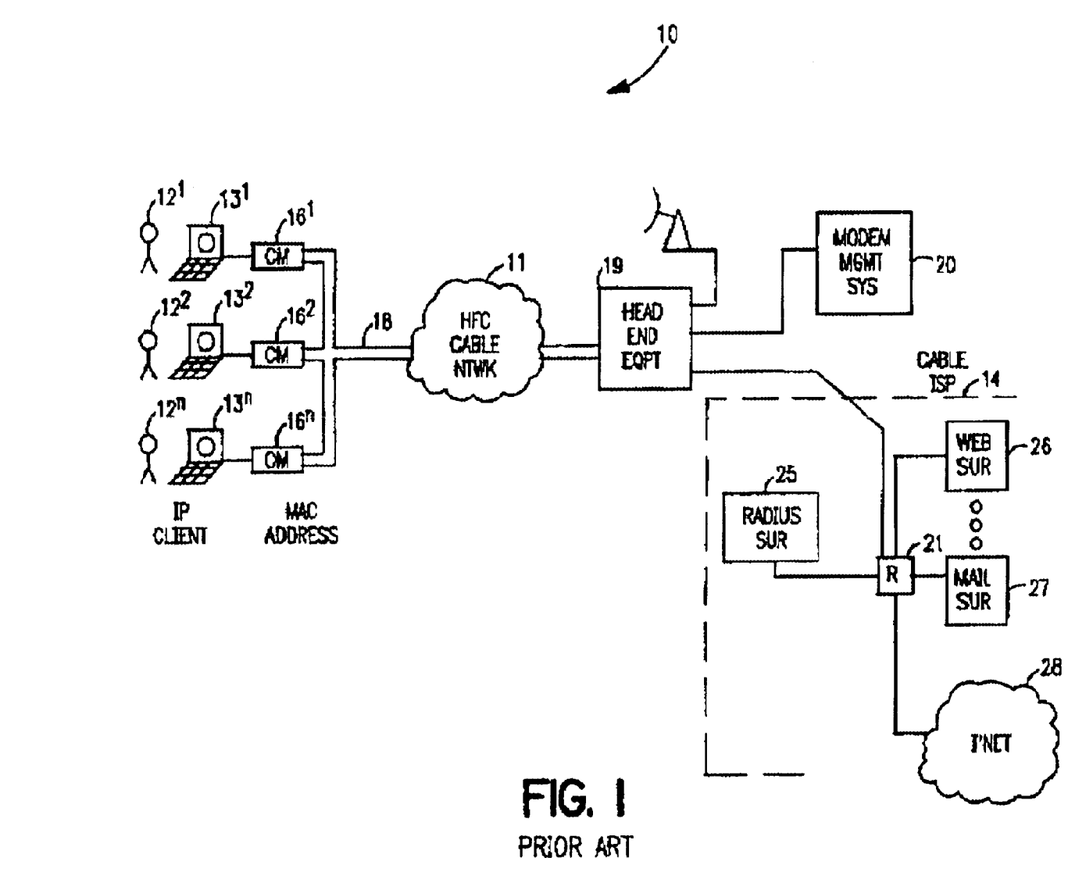
FIG. 1 is a prior art representation of a broadband network providing broadband customers access to the Internet through an Internet Service Provider (ISP) affiliated with the network.

In FIG. 1 a broadband, shared link multi-user network 10, such as cable, satellite, radio, LAN/Wan includes a network 11 coupled a plurality of customers $12^1$, $12^2$ ... $12^n$ and an Internet Service Provider (ISP) 14 associated with the network 10. For simplicity, the broadband network 10 will be described in terms of a cable network 11 in which the customers $12^1$ ... $12^n$ include cable modems $16^1$, $16^2$ ... $16n$ which link the customers through a broadband cable 18 to a cable affiliated ISP server 20. Typically, the cable modems use an Ethernet protocal for the computers $13^1$, $13^2$ and $13^n$. The modems look like any LAN network to the computer. The computers use a frequency shift to put an Internet protocal into a given channel assignment on the cable 18. Typically, the modems 16', $16^1$ share the last mile of the cable to the server 20. As a result, the server cannot send responses back to the cable or broadband customers based on an individual line or port connection point as in the case of a dial-in modem connection to the Internet. In the latter case, an ISP attaches the user to an authenication server, typically a Remote Authenication Dial in User Services (RADIUS) server which is a software-based security authenication protocol developed by the Internet Engineering Task Force (IETF) RADIUS Working Group and available from a number of suppliers including Microsoft, Redmond, Wash. RADIUS provides access to all Internet services using one username and password. If the authenication is correct, the customer is assigned a temporary IP address from the ISP's pool of available addresses using a protocol called Dynamic Host Configuration Protocol (DHCP). DHCP provides a mechanism through which computers using Transmission Control Protocol/Internet (TCP/IP) can obtain protocol configuration parameters automatically through the network. The most important configuration parameter is an IP address carried by DHCP and asssigned to a computer from a pool of IP addresses managed by DHCP. DHCP is an open standard, developed by the Dynamic Host Configuration working group (DHC WG) of the Internet Engineering Task force (IETF).

In the case of a cable system, however, to route messages to the correct cable modem, a lower level routing mechanism is used. Each cable modem is assigned a unique Medium Access Control (MAC) address on a shared cable. The communication protocol beneath the Internet protocol layer handles the MAC addresses. The MAC addressing maps out the physical network at the LAN adapted card level. IP addressing maps out the logically connected machine at the host level. An inter office LAN with an occasional Internet use would have continuously assigned MAC addresses to its computer. Some computers may occasionally get a Dynamic Host Control Protocol (DHCP) assigned address to use with a connection. Unique MAC addresses are typically embedded by the manufacturer into the ROM of the LAN network interface card and are not associated with RADTUS server authentication or ISP address assignment Continuing in FIG. 1, the cable network 11 is coupled to head end equipment 19 providing the customer with cable services as recorded by a modem management system 20 and to the cable affiliated ISP server 14. Included in the ISP are a router 21 linked to the Internet 28. The router is further linked to a RADIUS server 25; a web server 26 and a mail server 27 for accessing the Internet 28.

Figure 3A:
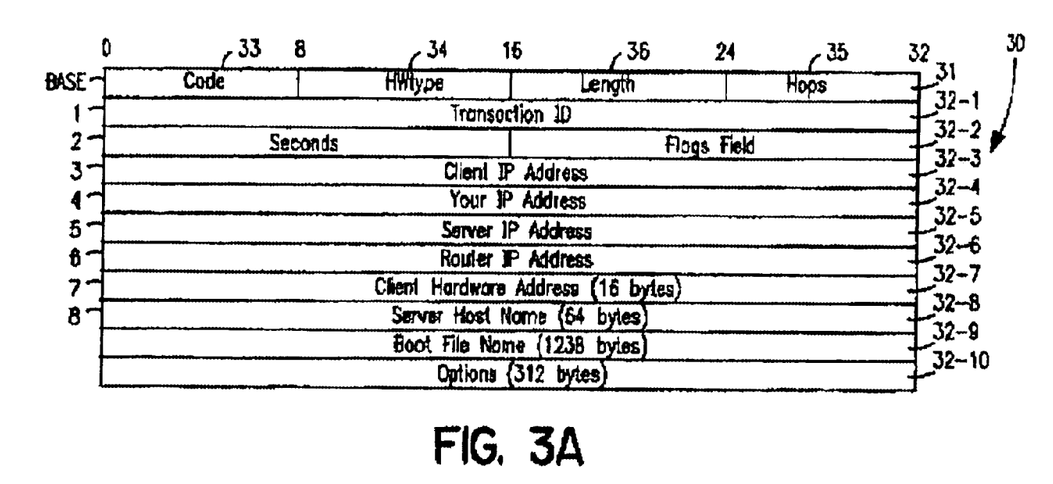
FIG. 3A is a representation of a dynamic host controlled protocol (DHCP) message format used in the system of FIG. 1 enabling customers to access the Internet through an ISP associated with the system.

In operation, a cable customer sends a DHCP message 30 shown in FIG. 3A to the ISP 14. The message is a standard DHCP packet which contains a base layer 31 containing a code field 33; hardware type field 34, hardware address length field 36, and the number of message hops 35 implemented by routers and ten (10) stacked layers 32-1 ... 31-10 superimposed on the base layer. Each stacked layer is 4 bytes wide unless otherwise noted. The first layer 32-1 contains a transaction ID 31 which is a random number assigned by the customer to uniquely identify a reply. The second layer field 32-2 indicates the customer time since bootup and a flag field which indicates the type of message. A bit one in the flag indicates broadcast. Other flag bits may be reserved and set to 0. The third layer 32-3 contains a client IP address which is set to 0.0.0.0 or the last known non-expired address of the client. The fourth layer 32-4 contains the customer address set by the server if the client IP address was 0.0.0.0. The fifth layer 32-5 contains a server IP address which is set by the server that handles the request. The sixth layer 32-6 contains a router address set by a forwarding router. The seventh layer 32-7 contains a client hardware address set by the client. The eighth layer 32-8 may optionally contain the null terminated host name of the responding server. The ninth layer 32-9 contains a boot file name used by the client in the boot up process when BOOTP is also in use. The tenth layer 32-10 contains an options row which when used with BOOTP, typically includes a code 99.130.83.99 in the first four bytes to identify the mode that the succeeding data is to be interpreted. This code is followed by tag options as defined in IEFT RFC 2132. These DHCP options may include information on routers, DNS, and other domain information. The message is processed at the head equipment and passed to the RADIUS server, which uses the MAC address of the sending modem as a source address for the customer. Customer messages are processed through the Internet using the web server or the mail server, as the case may be.

Currently, there is no way to enable a group of cable users to choose an ISP not affiliated with the cable company. The customer may send a connection request to their ISP and to the related authenication server, but since the network authenication server is not yet assigned the customer's IP address to them, there is no way for the server return message to be routed back to the customer.

Figure 2:
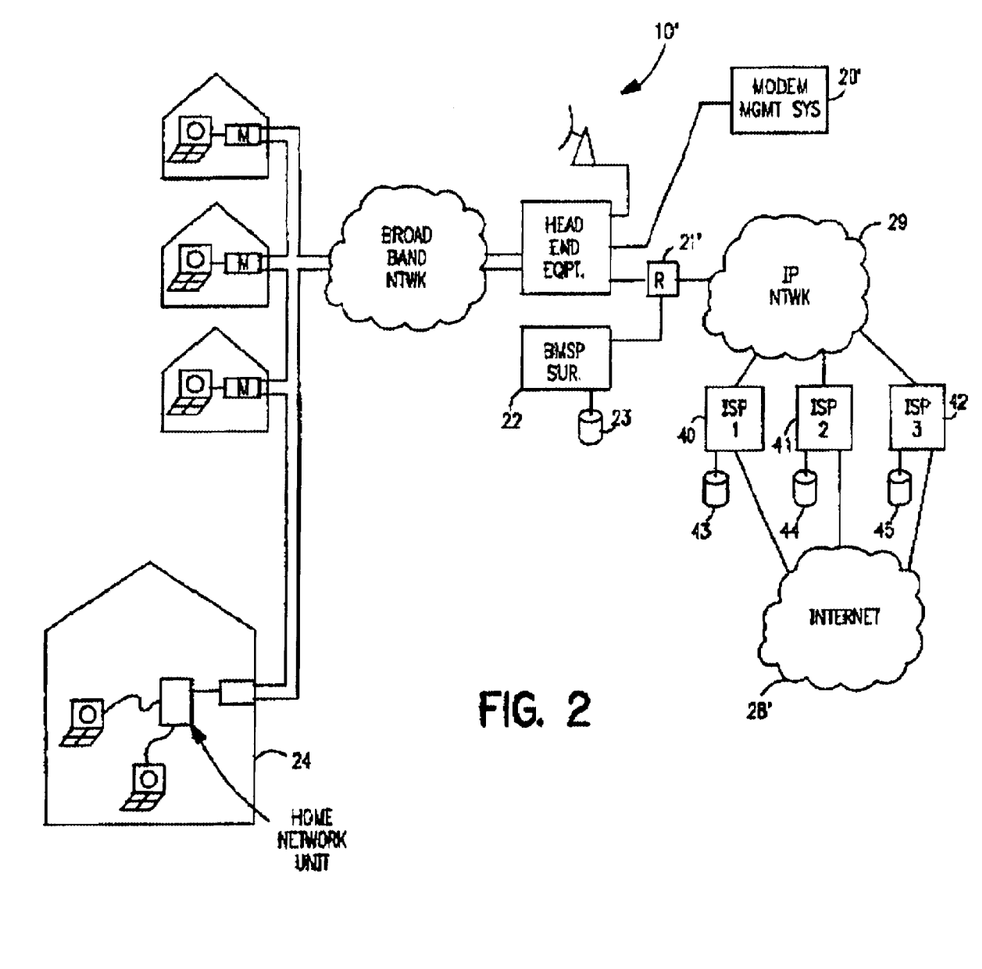
FIG. 2 is a representation of a broadband network including a Broadband Multi-service Proxy Server (BMPS) providing broadband customers access to the Internet through an ISP of their choice and incorporating the principles of the present invention.

A solution to the problem of enabling broadband customers to select an ISP of their choice is shown in FIG. 2.

Figure 3B:
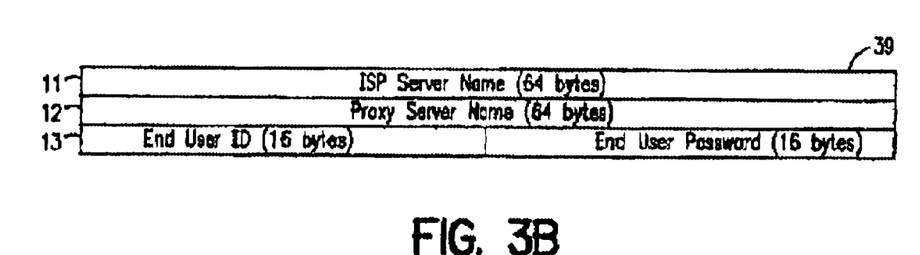
FIG. 3B is a representation of the additional fields proposed as an extension to the dynamic host controlled protocol (DHCP) message format used in the system of FIG. 2 enabling customers to access the Internet through an ISP of their choice.

In FIG. 2 the broadband network 10' is the same as in FIG. 1, except the ISP server 14 is replaced with a Broadband Multi-service Proxy Server (BMPS) 22 including a database 23. A BMPS is a conventional server programmed according to FIGS. 5A–5C, to be described hereinafter. A home network 24 has been added to the cable network 10' as an option to the network. The BMPS is linked to the router 21' for accessing a plurality of Internet Service Providers 40, 41, and 42 via an ISP network 29. Databases 43, 44 and 45 are associated with the ISPs 40, 41, 42, respectively. The ISPs are coupled to the Internet 28'. An extended DHCP message structure 39 shown in FIG. 3B, is used in accessing the ISPs The extended DHCP message structure includes an additional layer 32-11 containing an ISP server name; a layer 32-12 containing the BMPS name, and a layer 32-13 containing the customer or end user ID and password.

Returning to FIG. 2, prior to sign on the customer contacts an ISP(s) for Internet service and is provided with a user ID, password and logon script. The customer information is recorded in a database(s) 40, 41,43, as the case maybe. Upon sign on the customer authentication function is accomplished in a cooperative manner between different servers, the BMPS and the selected ISP server. The BMPS processes the initial customer DHCP logon request. The request may or may not have a server or client IP address identified per the standard Internet DHCP process. The underlying protocol can be whatever protocol is supported by the cable modem. As part of the logon message, the MAC address is attached to identify the origination point of the message. This MAC address is placed in the client hardware address field, FIG. 3a 32-7, of the DHCP package. The BMPS checks the modem MAC address against the modem management system to verify the customer is legitimate and then obtains and records the customer profile for management and billing purpose in the database 23'. The server 21 sends the logon request to the selected ISP on behalf of the customer using the DHCP message 30 and the extended DHCP message 39 (See FIGS. 3A and 3B) including the customer or end user ID and password or another unique identifier. The ISP server checks the ID and password in the associated database 40, 41, 42, as the case maybe, for authentication and if legitimate proceeds as normal returning an IP address assignment to the source address i.e., the server 22 using the DHCP message formats 30 and 39. The server 22 updates the database 23 and routing table in router 21' so as to allow future customer messages with the authenticated address to traverse the links authorized to the selected ISP. The customer updates his address mechanism with a valid IP address for IP usage. Future IP packets flow from the customer to the router 21' then to the selected ISP which forwards the message to the message destination. Return packets from the message receiver reverse the route to the customer. The server 22 can remain in the serial path if desired to continue to check on the validity of the packet and count the packets for billing purposes traversing the links or the server 22 can be removed from the link allowing the packets to flow directly to the router, as described. When the Internet session is over, the selected ISP sends the BMPS 22 a sign out message for the assigned address that was used. Thereafter, the BMPS 22 will remove that source address of the valid source or destination address in the router table.

Figure 4:
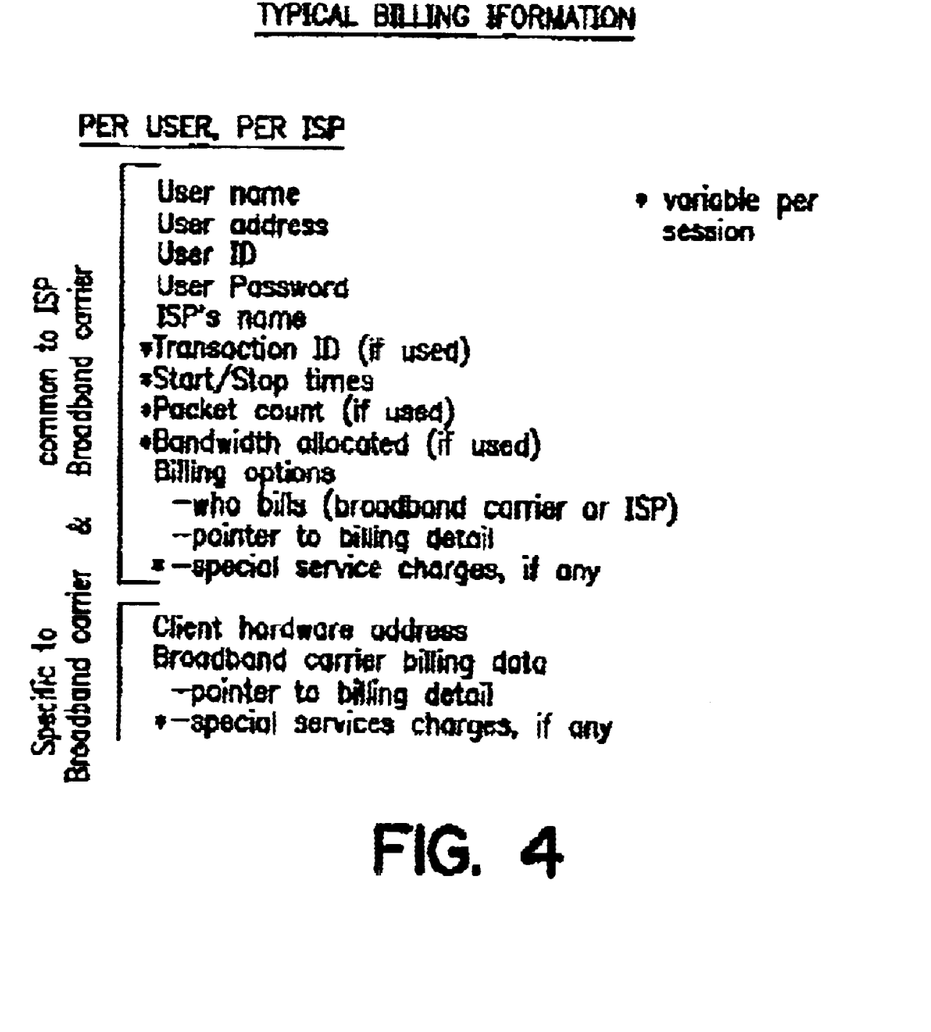
FIG. 4 is a representation of typical billing information used in the system of FIG. 2.

Since the customer is serviced by both the cable company and the ISP, billing information and customer care information needs to be collected for both parties. Some collected information may be solely pertinent to the cable supplier. Other information may be solely pertinent to the ISP. Still other information may be common to both the cable company and the ISP. FIG. 4, show typical information which may be collected and stored in the modem management system. The information common to the ISP and broadband carrier includes User Name; User Address; User ID; User Password and ISP name. Information variable per session includes Transaction ID; Start/Stop times; Packet count; Bandwidth allocated and special service charges. Information special to the broadband carrier includes Client Address; and Broadband carrier billing data including a pointer to billing detail and special service charges.

Figure 5A:
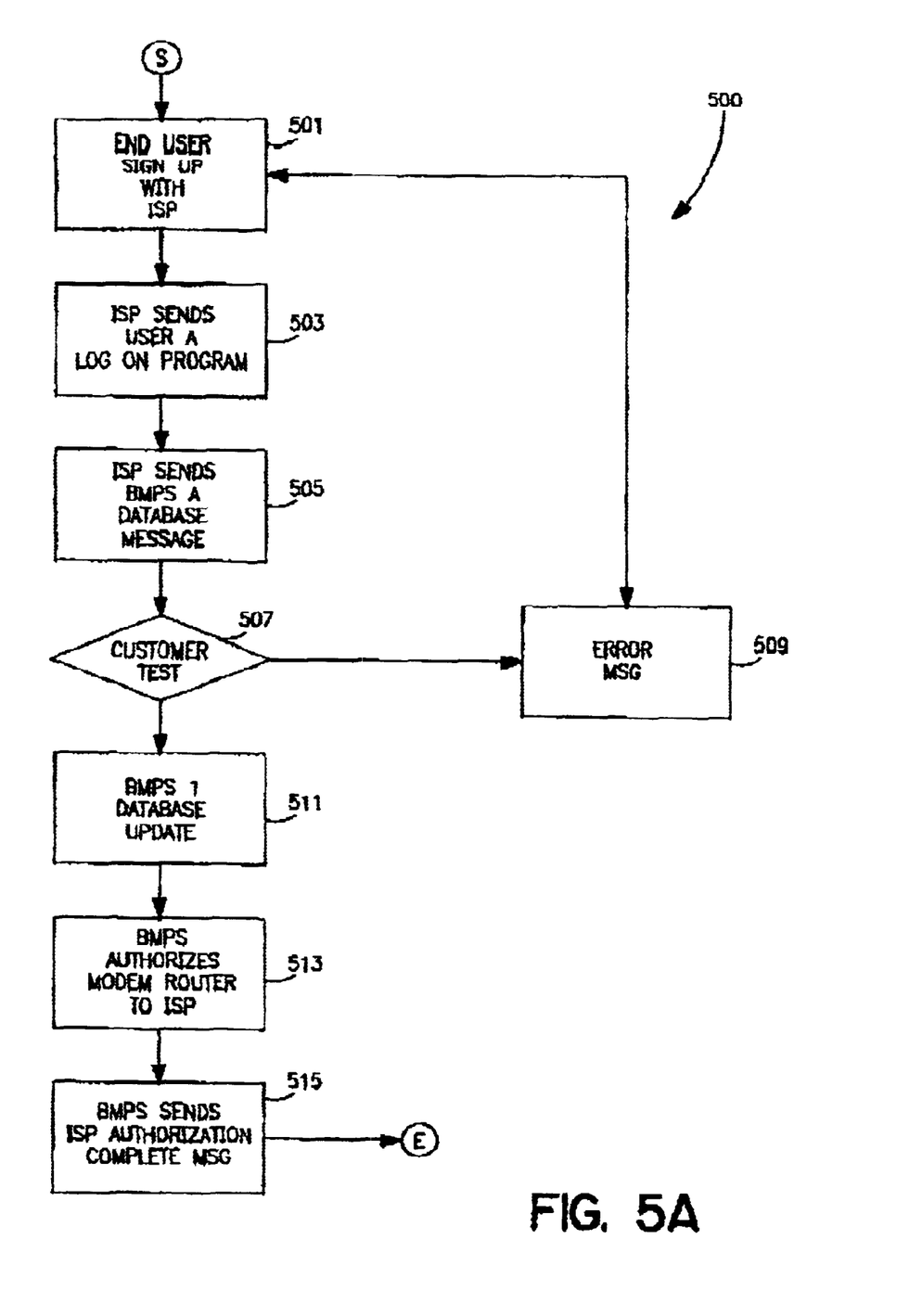
FIGS. 5A, B and C are flow diagrams for connecting broadband customers in FIG. 2 to ISPs of their choice.

Now turning to FIGS. 5A, B and C, the system in FIG. 2 will be described in terms of a process 500 enabling broadband customers to access the Internet through one or more ISPs of their choice, as follows:

In FIG. 5A the process 500 is entered in block 501 in which a customer or end user signs up for ISP service typically by means other than the network, for example, mail, phone, card, etc. In block 503 the ISP(s) sends the customer a logon program with the ISP's IP address, logon script and a customer ID and password. In block 505 the ISP sends the BMSP server a database update message containing the user name, user ID, password and any other details required to uniquely identify the user to both the ISP and the BMPS. A test is performed by the BMPS in block 507 to determine if the customer is a current broad band customer. A "no" condition initiates an error message in block 509 in which the BMPS server responds to the ISP with an unknown user error message after which the process returns to block 501. A "yes" condition for the test 507 transfers the process to the block 511 in which the BMPS updates the database 23 with the information and maps the data to a physical broad based modem sending or source address such as the modem MAC address. Thereafter in block 513 the BMPS authorizes the customer modem and router for access to the ISP for DHCP messages or other services indicated in the user profile. The BMPS sends the authorization message to the ISP host in block 515 after which the customer is ready to access the internet through the ISP of his/her choice.

Figure 5B:
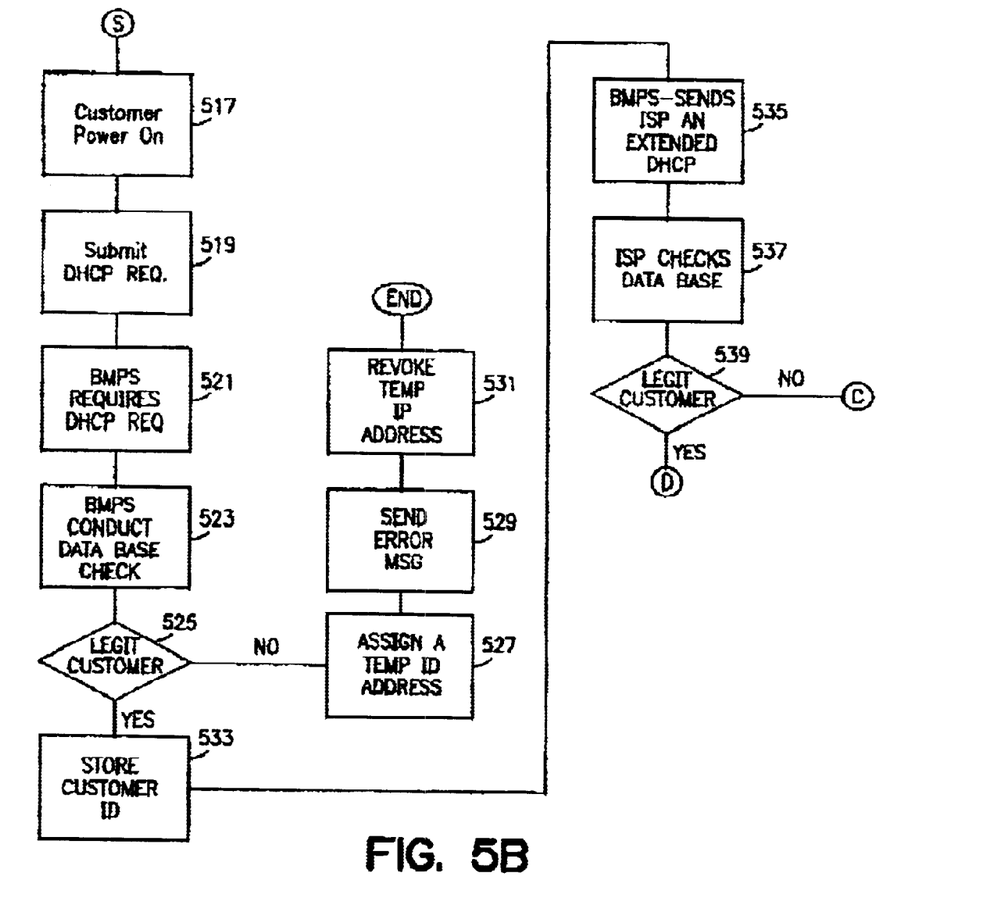

In FIG. 5B the customer powers on in block 517 and selects an access logon script to the selected ISP. In block 519 the customer sends an extended DHCP request (FIGS. 3A and 3B) through the broad band modem onto the cable network 11'. The BMPS receives the customer DHCP request block 521. The BMPS checks the database for the customer profile in block 523. A test is conducted in block 525 to determine if the customer is a legitimate broad band customer. A "no" condition initiates a temporary assignment of an IP address using the DHCP response in block 527. The BMPS sends the customer an unknown user error message in block 529 and revokes the temporary EP address in block 531 after which the process returns to start.

A "yes" condition for the test 525 stores the customer ID and password in its database in block 533. In block 535 the BMPS sends the selected ISP the extended DHCP message with user ID and password and using the BMPS server as the source address. In block 537 the ISP receives the extended DHCP message; checks its database for the customer ID and password in the network 11' and BMPS 22.

In block 539, the ISP conducts a test to determine if the DHCP request on message is from a legitimate customer.

Figure 5C:
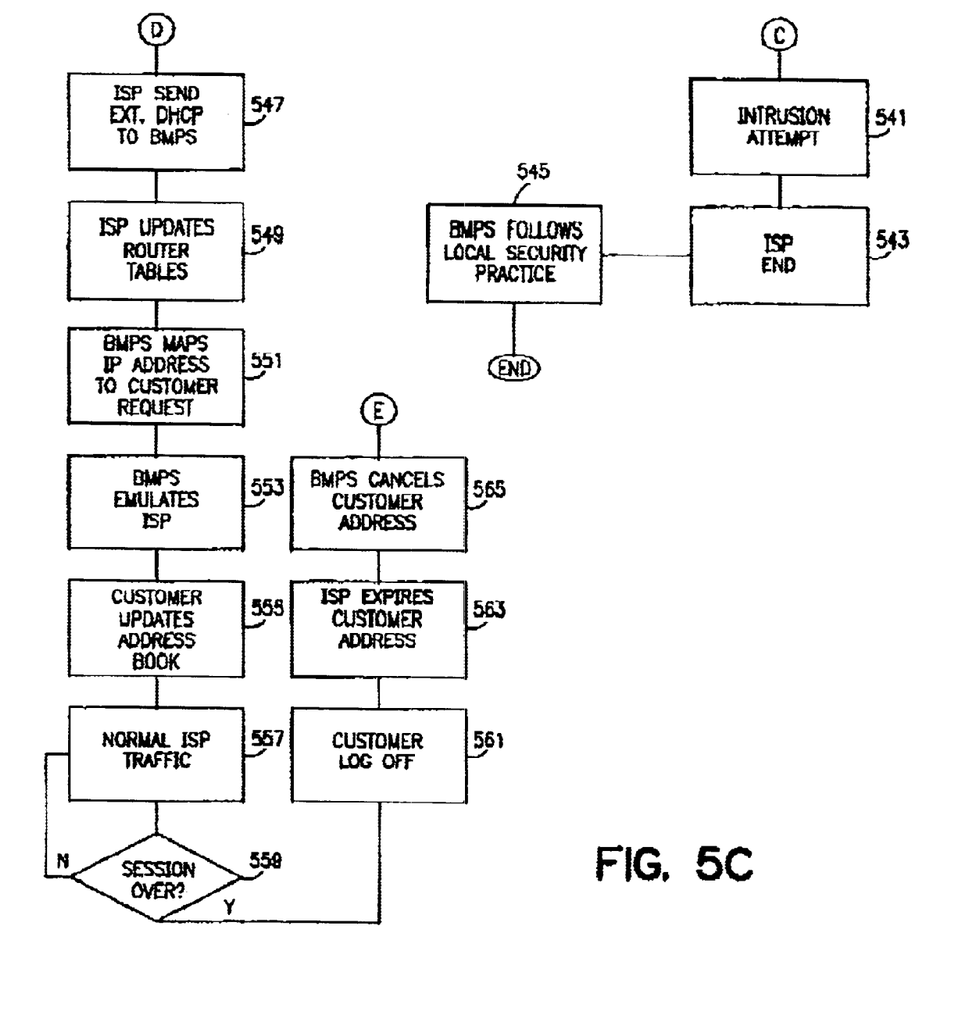

Turning to FIG. 5C, a "no" condition for the test 539 nullifies the DHCP request message and in block 541 the ISP does not assign an IP address to user but notifies the BMPS of an intrusion attempt. The ISP terminates processing the DHCP logon request in block 543 and transfers to a waiting state.

In block 545 the BMPS follows its local security practices with respect to intrusions and the process ends.

A "yes" condition for the test 539 initiates block 547 in which the ISP sends an extended DHCP response with the customers assigned IP address to the BMPS. The ISP updates the router tables in block 549 which allows the customer to use the IP address. The BMPS maps the assigned IP address to the appropriate outstanding customer request in block 551. In block 553 the BMPS emulates the ISP and sends a standard DHCP reply to the customer and then updates the network router to allow the new address. The customer updates its address book in block 555 to include the assigned IP address in the address field of messages. With the IP address the customer conducts normal ISP traffic in block 557. A test is performed in block 559 to determine if the session with the ISP is ended. A "no" condition returns the process to block 557. A "yes" condition for the test 559 initiates block 561 in which the customer logs off using normal log off procedures. In block 563 the ISP allows the customers ISP address to expire; updates its router tables and sends a log off message to the BMPS. The BMPS cancels the customer address in blocks 565 and updates its routers; database and billing files as necessary after which the process ends.

While the invention has been shown and described in conjunction with the preferred embodiment, various changes can be made without departing from the spirit and scope of the invention as defined in the appended claims, in which:

We claim:

1. A broadband Internet Protocol (IP) based network, comprising:
    at least one customer coupled to the network via a broadband multi service proxy server (BMPS) including a database and a router;
    means for registering the at least one customer with a selected Internet Service Provider (ISP) for all IP services, prior to receiving the services;
    means responsive to the ISP registration for storing in the database a customer identification, ID and password generated by the ISP;
    means for generating a DHCP message including an extended portion, which contains an ISP service name, a BMPS name, an end user ID and password, identifying the selected ISP in a customer request for all IP services with the BMPS serving as a proxy for the selected Internet Services Provider (ISP);
    means for receiving and routing the customer request and extended DHCP request to the selected ISP for providing a unique customer IP address and all IP services to the customer after updating routing tables in the router by the ISP;
    means mapping the unique customer IP address to the DHCP request; and
    means for directing future customer requests for and responses from all IP services directly to the selected ISP or any internet service based on the updated routing tables.

2. The broadband network of claim 1 further comprising:
    modem means for coupling the customer to the network; and
    means for generating the unique customer IP address as part of the DHCP request.

3. The broadband network of claim 1 further comprising:
    means for storing customer IP address information in the database.

4. The broadband network of claim 1 further comprising:
    routing means coupled to the BMPS for serving a plurality of ISPs.

5. A broadband multi service proxy server (BMPS), comprising:
    means coupling the server via a router to a broadband IP based network serving a plurality of customers;
    means coupling the server and the router to an IP network via at least one Internet Service Providers (ISP) in a plurality of ISPs, the server providing proxy services of the ISP;
    means for generating a customer request including an extended DHCP message for access to the IP network, the extended DHCP message including an ISP service name, a BMPS name, an end user ID and password of a selected ISP for all ISP services;
    ISP means for sending the server a unique customer IP address in response to the extended DHCP message;
    means for mapping the unique customer IP address to the DHCP request;
    means enabling the customer to access the selected ISP of choice for IP network services; and
    means for directing future customer requests for and response from IP services directly to the selected ISP or any selected internet service after updating routing tables in the router.

6. The server of claim 5 further comprising:
    means for storing the unique customer IP address in the server as an origination source for a customer request.

7. The server of claim 5 further comprising:
    means for pre-registering a customer for IP service with an ISP prior to generating a customer request; and
    means for sending the server a customer ID and password for customers registered by the ISP.

8. The server of claim 5 further comprising:
    means for sending a DHCP and unique customer IP address in a customer request for access to the IP network;
    means for receiving the customer request and storing the unique customer IP address in a database couple to the server.

9. The server of claim 5 further comprising:
    means for sending the server an extended DHCP response and customer assigned IP address for customer requests validated by the ISP.

10. The server of claim 5 further comprising:
    means for mapping validated customer requests to the unique customer IP address; and
    means emulating the ISP and sending the customer a DHCP response to the customer request.

11. The server of claim 5 further comprising:
    means for validating a customer request for access to the IP network at the ISP of customer choice.

12. In a broadband IP based network including server means coupled to the network and to a plurality of ISPs via a switching means, a method of providing IP services to network customers via an ISP of their choice, comprising the steps of:
    registering a customer for IP services from a selected Internet service provider (ISP);
    generating a request by the customer including a DHCP message for IP services from the selected ISP;
    sending the request and DHCP message to a server for processing to determine if the customer is approved by the network for receiving IP services, the server providing proxy services for the ISP;

sending the request and an extended DHCP message containing an ISP service name, a BMPS name, an end user ID and password for IP service to the selected ISP for all ISP services;

returning the extended DHCP message to the server with a customer IP address and updating tables in a switching means to provide the customer with IP services directly from the selected ISP;

mapping the unique customer IP address to the DHCP request; and directing future customer requests for and responses from IP services directly to the selected ISP or selected internet service;

emulating the ISP by the server means and sending a DHCP reply to the customer followed by updating the switching means to allow the customer to access the ISP of choice.

13. The method of claim 12 further comprising the step of:

checking the extended DHCP message by the ISP to determine if the customer is approved to receive IP services.

14. The method of claim 12 further comprising the step of:

notifying the server when the ISP determines the customer is not approved to receive IP services.

15. The method of claim 12 further comprising the step of:

sending the server a customer ID and password for customers registered by the ISP.

16. The method of claim 12 further comprising the step of:

sending the server an extended DHCP response and customer assigned IP address for customer requests validated by the ISP.

17. The method of claim 12 wherein the unique customer IP address expires upon customer log off.

* * * * *